UNITED STATES PATENT OFFICE.

LOUIS E. LEVI, OF MILWAUKEE, WISCONSIN, ASSIGNOR OF ONE-THIRD TO CONRAD HENRY PROPACH, OF CHICAGO, ILLINOIS.

WATERPROOFING AND STRENGTHENING COMPOUND FOR CONCRETE.

1,128,696.  Specification of Letters Patent.  Patented Feb. 16, 1915.

No Drawing.  Application filed April 29, 1912. Serial No. 693,860.

*To all whom it may concern:*

Be it known that I, LOUIS E. LEVI, a citizen of the United States and resident of Milwaukee, in the county of Milwaukee and State of Wisconsin, have invented new and useful Improvements in Waterproofing and Strengthening Compounds for Concrete, of which the following is a description.

This invention relates to a compound for waterproofing and strengthening concrete by being mixed with the ingredients forming the concrete or by being applied as a surface wash to fill the pores of concrete.

In preparing the compound of this invention I make use of the following ingredients or their equivalents in substantially the proportions given:

| | | |
|---|---|---|
| Soap (tallow) | 70 | parts. |
| Carnauba wax | 5 | " |
| Resin | 30 | " |

The resin is dissolved in soda ash (sodium carbonate $Na_2CO_3$) and water and the soap is added and when dissolved the carnauba wax is added. When all are dissolved I add calcium chlorid ($CaCl_2$) solution in the cold. I then filter and wash precipitate carefully to remove all soluble material and then dry it and powder it finely so that it will pass through a 100 or 200 mesh sieve. This precipitate is mixed with hydrated lime ($Ca(OH)_2$) in the proportion of one part of the precipitate to two parts of hydrated lime and the mixture is ground thoroughly and again passed through a sieve of 100 or 200 mesh. The resulting compound constitutes the commercial product for use in strengthening and waterproofing concrete and is preferably used by mixing it thoroughly with the cement in approximately the proportion of two parts of the compound to ninety-eight parts of cement. Concrete made in the usual way but having the compound of this invention mixed therewith is found to have its tensile strength greatly increased and is rendered impervious to moisture by having its pores filled with insoluble salts so as to be entirely free from the destructive action of frost.

In preparing the compound the soluble salts of a fatty acid, and a saponifiable wax and a resin are rendered insoluble by being precipitated by the calcium chlorid. The purpose of using calcium chlorid as a precipitant is on account of its cheapness as a commercial product and I do not confine myself to its use alone but within the scope of the invention may use any other precipitant which will convert the soluble salts into insoluble salts.

The presence of the hydrated lime is to serve as a filler to increase the bulk of the compound and thus facilitate the measuring of the quantity of the compound for actual use.

By experiment it has been found that compounds made from soap and carnauba wax alone without resin and compounds made from carnauba wax and resin alone without the soap and having the salts precipitated with calcium chlorid produce favorable results, but not as good as the compound prepared as above described.

While tallow soap is preferable for the purpose any other soap may be substituted.

What I claim as new and desire to secure by Letters Patent is:

1. A compound for waterproofing and strengthening concrete, comprising an insoluble salt or stearic acid, an insoluble salt of carnauba wax, and an insoluble salt of resin.

2. The process of producing a waterproofing and strengthening compound for concrete which consists in part in precipitating insoluble salts of carnauba wax and resin from soluble salts of carnauba wax and resin.

3. The process of producing a waterproofing and strengthening compound for concrete which consists in dissolving together a soluble salt of stearic acid, a soluble salt of carnauba wax and a soluble salt of resin, and then precipitating these salts with a precipitant which will form insoluble compounds by reaction therewith.

4. The process for producing a compound for waterproofing and strengthening concrete which consists in dissolving a resin in sodium carbonate and water, adding soap thereto, and when dissolved adding carnauba wax and then precipitating with calcium chlorid, filtering and washing precipitate to remove soluble material and then drying and pulverizing the insoluble salts thus obtained.

5. The process of producing a compound for waterproofing and strengthening concrete which consists in dissolving approximately 30 parts of resin in sodium carbonate and water and adding approximately 70 parts of soap and when dissolved adding approximately 5 parts of carnauba wax and when all are dissolved precipitating with calcium chlorid and filtering and washing the precipitate and drying and pulverizing it.

6. The process of producing a waterproofing and strengthening compound for concrete which consists in part in precipitating insoluble salts of carnauba wax and resin from soluble salts of carnauba wax and resin formed from a mixture of soap, carnauba wax and resin.

7. The process of producing a waterproofing and strengthening compound for concrete which consists in part in precipitating insoluble salts of carnauba wax and resin from soluble salts of carnauba wax and resin formed from a mixture of soap, approximately 70 parts, carnauba wax, approximately 5 parts, and resin, approximately 30 parts.

In testimony whereof, I affix my signature, in presence of two witnesses.

LOUIS E. LEVI.

Witnesses:
KATHERINE HOLT,
R. S. C. CALDWELL.